(12) United States Patent
Fantuz

(10) Patent No.: US 12,431,156 B1
(45) Date of Patent: Sep. 30, 2025

(54) SYSTEMS AND METHODS FOR AUDIO TIMING AND SYNCHRONIZATION

(71) Applicant: Datavault AI Inc., Beaverton, OR (US)

(72) Inventor: Mitchell Fantuz, Beaverton, OR (US)

(73) Assignee: DATAVAULT AI INC., Beaverton, OR (US)

( * ) Notice: Subject to any disclaimer, the term of this patent is extended or adjusted under 35 U.S.C. 154(b) by 259 days.

(21) Appl. No.: 18/196,383

(22) Filed: May 11, 2023

Related U.S. Application Data

(60) Provisional application No. 63/340,904, filed on May 11, 2022.

(51) Int. Cl.
G10L 21/04 (2013.01)
G10L 15/06 (2013.01)
G10L 15/12 (2006.01)
G10L 15/28 (2013.01)

(52) U.S. Cl.
CPC .............. G10L 21/04 (2013.01); G10L 15/06 (2013.01); G10L 15/12 (2013.01); G10L 15/285 (2013.01)

(58) Field of Classification Search
CPC .......... G10L 21/04; G10L 15/06; G10L 15/12; G10L 15/285; H04J 3/0667; H04J 3/065; H04J 3/0682; H04W 56/001; H04W 56/015; H04W 56/0045; H04W 56/002; G06F 1/12
See application file for complete search history.

(56) References Cited

U.S. PATENT DOCUMENTS

| | | | |
|---|---|---|---|
| 11,063,738 B1* | 7/2021 | Wang | H04L 7/0008 |
| 2015/0382050 A1* | 12/2015 | Le Nerriec | H04N 21/43076 725/80 |
| 2016/0165558 A1* | 6/2016 | Kafle | H04L 65/80 370/350 |
| 2019/0082400 A1* | 3/2019 | Powell | H04W 56/00 |
| 2023/0016860 A1* | 1/2023 | Fan | H04J 3/0667 |

FOREIGN PATENT DOCUMENTS

WO    WO-2021196801 A1 * 10/2021 .............. H04J 3/065

* cited by examiner

Primary Examiner — Yogeshkumar Patel
(74) Attorney, Agent, or Firm — Goodhue, Coleman & Owens, P.C.

(57) ABSTRACT

According to disclosed embodiments, methods and systems of data transmission are provided. An aspect of the present disclosure is a method for estimating a TSF value, the method comprising requesting a timing synchronization function (TSF) value, receiving a first TSF value after a TSF read delay, and estimating a second TSF value by compensating the first TSF value using the TSF read delay.

20 Claims, 7 Drawing Sheets

SYSTEMS AND METHODS FOR AUDIO TIMING AND SYNCHRONIZATION

CROSS-REFERENCE TO RELATED APPLICATIONS

This application claims the benefit of U.S. Provisional Patent Application No. 63/340,904, filed May 11, 2022, which is incorporated by reference herein in its entirety.

FIELD OF THE DISCLOSURE

The present disclosure is related generally to the wireless distribution of high-quality audio signals and, in particular to systems and methods of distributing high-bitrate, multi-channel, audio wirelessly while maintaining low latency.

BACKGROUND

Some wireless network devices or stations include a local timing synchronization function (TSF) timer to keep all elements in a network synchronized. Individual devices or stations perform read operations on a periodic basis. However, the response time for read operation to determine the current TSF timer values varies depending on hardware and software requirements. This time variation can lead to increased latency and computational requirements.

As noted, typical implementations of TSF read operations occur periodically. For example, in some implementations, a TSF read operation may occur every 48 ms, T=48 ms. In some implementations, due to hardware querying, TSF is not returned at specific time instances and instead includes some time delay. For example, a time delay at read instance n may be represented as n→t=nT+$\Delta t_n$. In some implementations, $\Delta t_n$ may not be consistent. In some implementations, $\Delta t_n$ may be random. These variations in $\Delta t_n$ may cause the TSF data to have unwanted noise, and any other processing that uses TSF measurements will have inaccurate and noisy results. In some implementations, if the current TSF value is needed but cannot wait for the next time instance T, it is advantageous to estimate or predict a future TSF value. That is, TSF at t=(n+α)T is desired but the information may be limited to the previous TSF value at t=nT, 0<α<1.

SUMMARY

The present disclosure provides for novel systems and methods of audio transmission that alleviate shortcomings in the art, and provide novel mechanisms for accurate determination of TSF values.

An aspect of the present disclosure is a method of audio transmission. In some embodiments, a method of audio transmission may determine a compensation value for TSF read delays using filtering. In some embodiments, methods described herein may use the time difference $\Delta t_n$, X(n+$\Delta t_n$) and previously read values, to filter and determine an estimate of TSF, $\hat{T}(n)$. In some embodiments, methods described herein may predict the next value at t=7n+1)T→$\hat{X}$(n+1). And, in some embodiments, using this prediction, the method may interpolate between time instances nT≤t≤(n+1)T.

BRIEF DESCRIPTION OF THE DRAWINGS

The foregoing and other objects, features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure.

DETAILED DESCRIPTION

Figure 1:
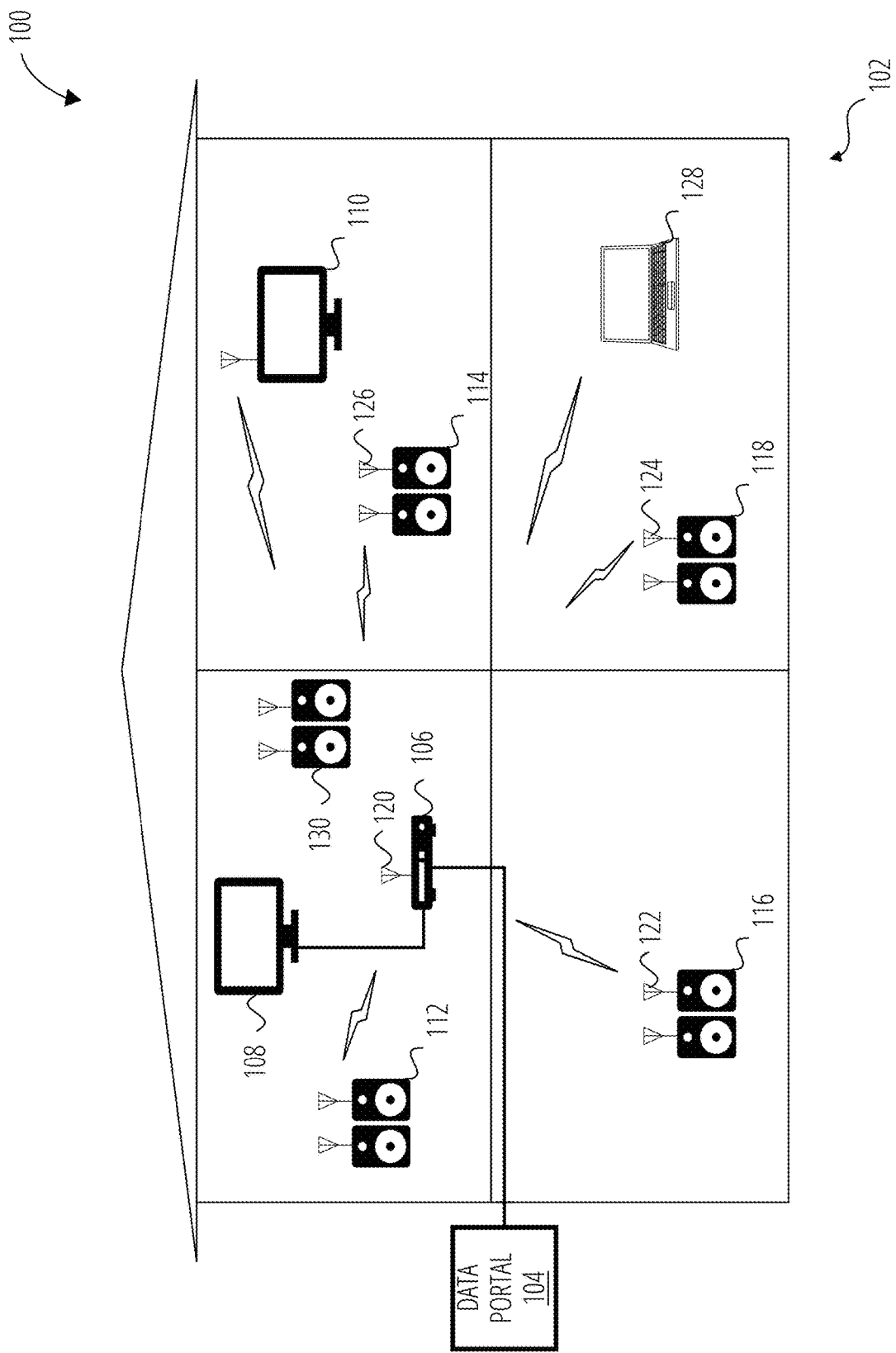
FIG. 1 is a block diagram illustrating non-limiting components of a general environment according to some embodiments of the present disclosure.

The present disclosure will now be described more fully hereinafter with reference to the accompanying drawings, which form a part hereof, and which show, by way of non-limiting illustration, certain example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware, or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general-purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

For the purposes of this disclosure a non-transitory computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, optical storage, cloud storage, magnetic storage devices, or any other physical or material medium which can be used to tangibly store the desired information or data or instructions and which can be accessed by a computer or processor.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

For purposes of this disclosure, a client (or consumer or user) device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device an Near Field Communication (NFC) device, a Personal Digital Assistant (PDA), a handheld computer, a tablet computer, a phablet, a laptop computer, a set top box, a wearable computer, smart watch, an integrated or distributed device combining various features, such as features of the forgoing devices, or the like.

The detailed description provided herein is not intended as an extensive or detailed discussion of known concepts, and as such, details that are known generally to those of ordinary skill in the relevant art may have been omitted or may be handled in summary fashion.

In some aspects, the techniques described herein relate to a method including requesting or otherwise determining a timing synchronization function (TSF) value and then receiving a first TSF value after a TSF read delay. Then, in some embodiments, the method includes predicting a second TSF value using a prediction model based on a compensated first TSF value, compensated using the TSF read delay. In some embodiments, the method can further include estimating a third TSF value between the first TSF value and the second TSF value by interpolating the first TSF value and the second TSF value.

In some aspects, the interpolation can include using an interpolation method such as polynomial or cubic spline interpolation. In some aspects, the prediction model can be a linear regression model. In some aspects, the compensation can be achieved using adaptive filtering. In some aspects, the compensation can be achieved using a Volterra filter. In some aspects, the prediction model can be a gradient descent model.

In some aspects, the techniques described herein relate to a non-transitory computer-readable storage medium, the computer-readable storage medium including instructions that when executed by a device, cause the device to request a timing synchronization function (TSF) value, receive a first TSF value after a TSF read delay; and predict a second TSF value using a prediction model based on a compensated first TSF value, compensated using the TSF read delay.

In some aspects, the techniques described herein relate to a device comprising: a processor; and a memory storing instructions that, when executed by the processor, configure the device to request a timing synchronization function (TSF) value; receive a first TSF value after a TSF read delay; and predict a second TSF value using a prediction model based on a compensated first TSF value, compensated using the TSF read delay.

Certain embodiments will now be described in greater detail with reference to the figures.

Referring now to FIG. 1, FIG. 1 illustrates an environment 100 according to some embodiments of the present disclosure. FIG. 1 shows components of a general environment in which the systems and methods discussed herein may be practiced. Not all the components may be required to practice the disclosure, and variations in the arrangement and type of the components may be made without departing from the spirit or scope of the disclosure.

According to some embodiments, in a building or residence 102 data, including video and audio data, may be retrieved from a storage medium, such as a DVD by a DVD player or from a data portal 104 connected to, for example, a wide area fiber optic network or a satellite receiver, and distributed throughout the residence. For example, in some embodiments, digital video and/or multi-channel audio may be distributed from a source 106 (e.g., DVD player, gaming console, computer, mobile device, and the like) for presentation by displays 108 and 110 and/or surround sound or stereo speaker units 112-130 in different rooms of residence 102. In some embodiments, at least part of the distribution network may comprise one or more radio transmitters 120 which may be part of a source 106 and one or more radio receivers 122-124 which may be incorporated in the networked devices such as a computer 128, a video display 110, or the speakers 112-118 of one or more a stereo or surround sound systems.

As will be noted, in some embodiments, synchronization of the various outputs and minimization of system latency may be essential to high quality audio/video systems. As will be further noted, source-to-output delay or latency ("lip-sync") is important in audio/video systems, such as home theater systems, where a slight difference (e.g, on the order of 50 milliseconds (ms)) between display of a video sequence and the output of the corresponding audio is noticeable. On the other hand, the human ear is even more sensitive to phase delay or channel-to-channel latency between the corresponding outputs of the different channels of multi-channel audio. In some embodiments, channel-to channel latency greater than 1 microsecond (s) may result in the perception of disjointed or blurry audio.

Audio video bridging (AVB) is the common name of a set of technical standards developed by the Institute of Electrical and Electronics Engineers (IEEE) and providing specifications for time-synchronized, low latency, streaming services over networks. "IEEE 108.1AS-2011—IEEE Standard for Local and Metropolitan Area Networks—Timing and Synchronization for Time-Sensitive Applications in Bridged Local Area Networks" describes a system for synchronizing clocks distributed among the nodes of one or more networks of devices.

According to some embodiments, in an audio video bridging (AVB) network, each network endpoint (e.g., a network node capable of transmitting and/or receiving a data stream) may include two clocks—a "wall" clock and a "media" or "sample" clock. In some embodiments, wall time output by the wall clock may determine the real or actual time of an event's occurrence and/or the real or actual time difference between the initiation of a task and the task's completion. In some embodiments, a sample clock may be an alternating signal which may control the rate at which data is passed to a media processing device for processing. For examples, in an embodiment, in a digital audio system, sample clocks may govern the rate at which an analog signal is sampled and the rate at which digital samples are to be passed to a digital-to-analog converter (DAC) controlling the emission of sound by a speaker.

Figure 2:
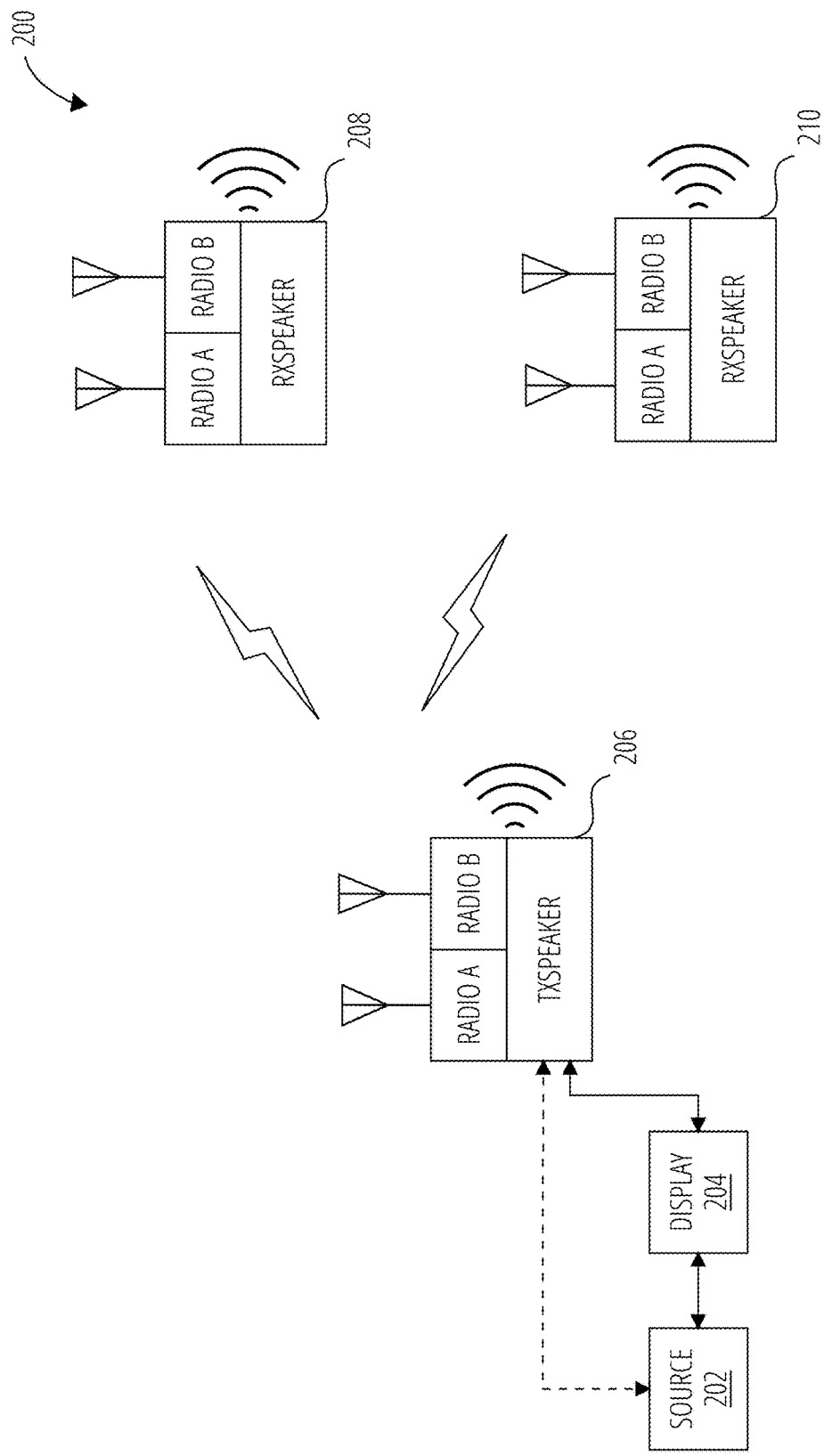
FIG. 2 is a block diagram illustrating components of data transmission network according to some embodiments of the present disclosure.

In general, with reference to FIG. 2, a system 200 in accordance with an embodiment of the present disclosure is shown. FIG. 2 shows components of a general environment in which the systems and methods discussed herein may be practiced. Not all the components may be required to practice the disclosure, and variations in the arrangement and type of the components may be made without departing from the spirit or scope of the disclosure. In some embodiments, different components of system 200 may be combined into a single device.

As shown, system 200 of FIG. 2 may include a data source 202, display 204, a transmitter-speaker (TxSpeaker) 206, and one or more receiver-speakers (e.g., RxSpeakers 208 and 210). In some embodiments, source 202 may be a source of digital audio and/or video. In some embodiments, source 202 may transmit an audio/video stream including a plurality of packets. In some embodiments, source 202 may be a media player, a gaming console, a networking device, a mobile device, or any other device capable of reproducing and/or transmitting media. In some embodiments, an audio/video stream may be provided to a display 204 for displaying (e.g., a television, a projector, a display monitor) visual media associated with the audio/video stream.

For example, in an embodiment, where the source 202 is a gaming console, source 202 may transmit audio and/or graphics corresponding to gameplay to the display 204. In turn, display 204 may display the graphics. In some embodiments, an audio component of a media stream may be transmitted directly from the source 202 to the TxSpeaker 206. In some embodiments, the media steam may be transmitted from the source 202 to the display 204 and, in turn, the display 204 may transmit audio information corresponding to the media stream to the TxSpeaker 206.

According to some embodiments, TxSpeaker 206 may process the audio information and transmit the processed or transformed audio information to the one or more RxSpeakers (e.g., RxSpeaker 208 and RxSpeaker 210).

According to some embodiments, system 200 may be a multi-radio architecture. In some embodiments, data transmitters and receivers of system 200 may utilize one or more radio chains to communicate. For example, in the non-limiting embodiment of FIG. 2, TxSpeaker 206 and RxSpeakers 208 and 210 have two radio chains Radio A and Radio B. In some embodiments, TxSpeaker 206 and RxSpeakers 208 and 210 may have one or more radio chains.

In an embodiment, TxSpeaker 206 and RxSpeakers 208 and 210 may communicate through independent radio chains. For example, in some embodiments, TxSpeaker 206 may communicate with RxSpeakers 208 and 210 through Radio A, Radio B, or both. It will be noted that, in some embodiments, any radio chain of TxSpeaker 206 and RxSpeakers 208 and 210 may communicate with any other radio chain. For example, in some embodiments, TxSpeaker 206 may use Radio A to communicate with Radio B of RxSpeaker 208 while communicating with Radio A of RxSpeaker 210. In some embodiments, any TxSpeaker or RxSpeaker may communicate with any other of TxSpeaker or RxSpeaker using any type of digital communications (including wired and wireless) known or to be known without departing from the scope of the present disclosure.

According to some embodiments, Radio A and Radio B may use Channel A and Channel B, respectively. In some embodiments, Channel A and Channel B may have a channel frequency. In some embodiments, Channel A and Channel B may be separated in channel frequency or band of operation (e.g., Frequency Diversity). In some embodiments, Channel A and Channel B may in the same band but have different bandwidths (e.g., 20/40/80/160 MHz bandwidth in 802.11ac). In some embodiments, Channel A and Channel B may be separated in time (e.g., Temporal Diversity). That is, in some embodiments, data packets may be sent over Channel A and/or Channel B at a different time slots to overcome a burst interference that has interfered with a primary time slot.

According to some embodiments, Channel A and Channel B may be separated in a Modulation Coding Scheme (e.g., Coding Diversity). That is, in some embodiments, data packets may be sent using different physical layer rates of a f a wireless network protocol. For example, in some embodiment, a physical layer rate may be 6 Mbps using Binary Phase-Shift Keying (BPSK) and a coding rate of 1/2 as disclosed in 802.11a. In some embodiments, a physical layer rate may be 54 Mbps using 64-QAM scheme and a coding rate of 3/4 as disclosed in 802.11a.

According to some embodiments, Channel A and Channel B may have different communication methods (e.g., Broadcast/Multicast v. Unicast). In some embodiments, where the channel communication method is Broadcast/Multicast, data packets may be transmitted to multiple receivers at the same time. In some embodiments, where the channel communication method is unicast, a transmitter may transmit data packets to individual receivers independently. It will be noted that as used herein, any of TxSpeaker 206, RxSpeaker 208, and RxSpeaker 210 may act be a receiver, a transmitter, or both.

According to some embodiments, Channel A and Channel B may have different retransmission methods (e.g., User Datagram Protocol (UDP), Transmission Control Protocol/Internet Protocol (TCP/IP)). In some embodiments, where the retransmission method is UDP, data packets may be sent without acknowledgment. In some embodiments, where the retransmission method is TCP/IP, acknowledgment of packet loss and retransmission of lost packets is supported.

According to some embodiments, Channel A and Channel B may use different radio Physical Layers (e.g., Orthogonal Frequency Domain Multiplexing (OFDM) as disclosed in 802.11a/n/ac, Frequency Hopping Spread Spectrum (FHSS) as disclosed by the Bluetooth standard, and Code Division Multiple Access (CDMA) as disclosed in 802.11b). In some embodiments, different Physical Layers can cover the same frequency band but use different medium access methods and spectral reuse properties. For example, in some embodiments, 802.11g and Bluetooth both share the 2.4 GHz Band, however, 802.11g may move from one 20 MHz Channel to another while Bluetooth dynamically may hop over an entire 80 MHz band in one packet period.

Figure 3:
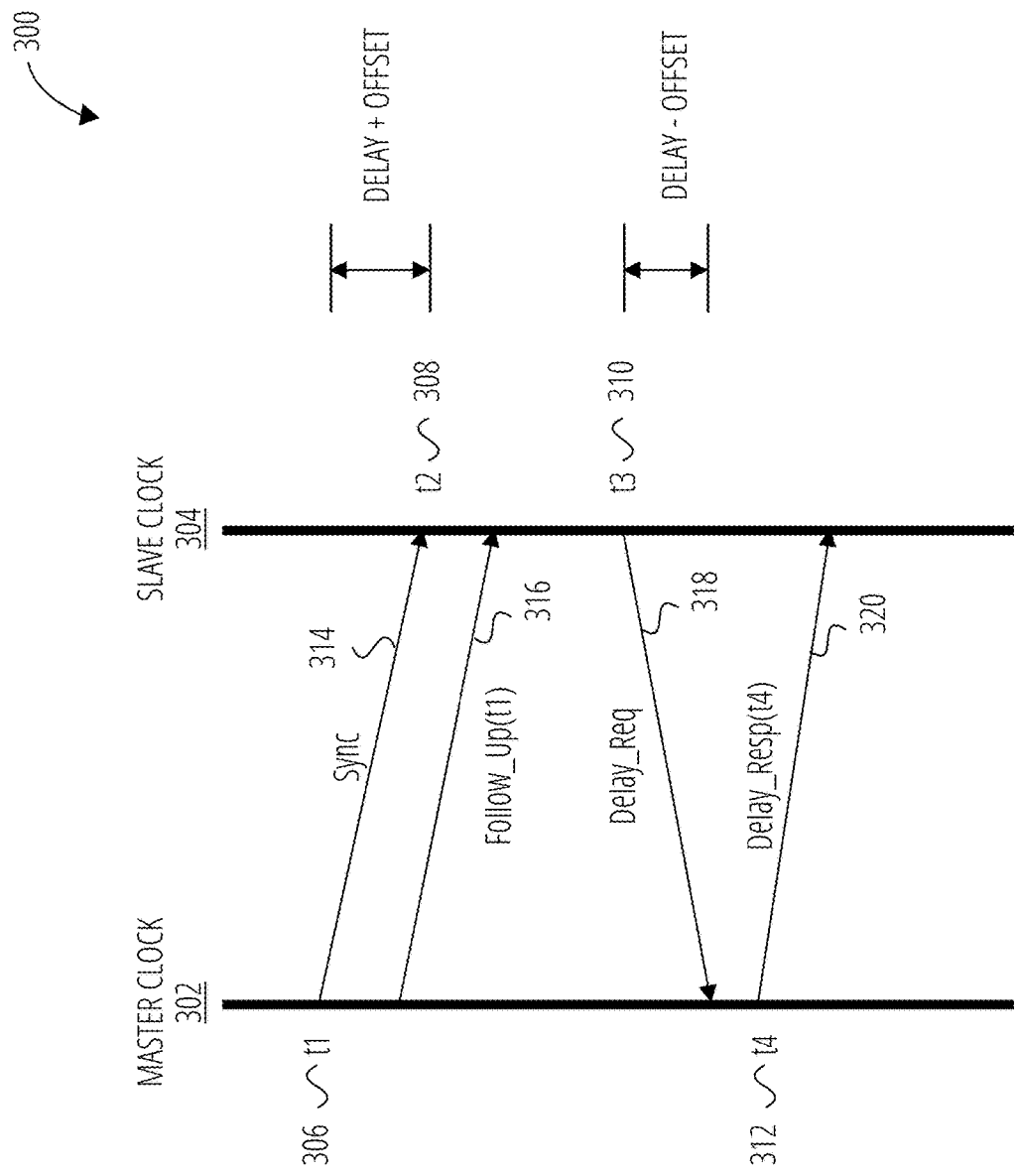
FIG. 3 illustrates a method for synchronizing clocks among devices in a network according to some embodiments of the present disclosure.

Referring now to FIG. 3, FIG. 3 illustrates a method for synchronizing clocks among devices in a network according to some embodiments of the present disclosure. FIG. 3 illustrates a Precision Time Protocol (PTP) of "IEEE Standard for a Precision Clock Synchronization Protocol for Networked Measurement and Control Systems," IEEE Std. 1588-2008 which provides, inter alia, a method 300 of synchronizing a wall time at "slave" clock 304 distributed among the nodes of a network to a wall time of the network's "master" clock 302.

According to some embodiments, when operation of a network is initiated, a master clock 302 may be selected either manually or by a "best master clock" algorithm. Afterward, messages may be periodically exchanged between a device comprising the master clock 302 (e.g., the "master device") and the network devices comprising the slave clocks 304 (e.g., the "slave devices") enabling determination of an offset, the time by which a slave clock leads or lags the master clock, and the network delay, the time required for data packets to traverse the network.

In some embodiments, at defined intervals (e.g., two second intervals) the master device may multicasts a Sync message 314 to the other network devices. In some embodiments, the precise master clock 302 wall time of the Sync message's transmission, t1 306, is determined and included as a timestamp in either the Sync message 314 or in a Follow-Up message 316. In some embodiments, the slave device determines the local wall time, t2 308, at which the device received the Sync message 314.

In some embodiments, a Delay_Req message 318 may then be sent by the slave device to the master device at time, t3 310. In some embodiments, the master clock's time of receipt, t4 312, of the Delay_Req message 318 is determined and the master device responds with a Delay_Resp message 320 which includes a timestamp indicating t4 312. In some embodiments, the slave device may then determine the network delay and the slave clock's offset from the four times, t1 306, t2 308, t3 310, and t4 312:

$$\text{Delay}+\text{Offset}=t2-t1 \quad (1)$$

$$\text{Delay}-\text{Offset}=t4-t3 \quad (2)$$

$$\text{Delay}=((t2-t1)+(t4-t3))/2 \quad (3)$$

$$\text{Offset}=((t2-t1)-(t4-t3))/2 \quad (4)$$

In some embodiments, consecutive measurements of the offset also permit compensation for the slave clock's frequency drift. In some embodiments, with the time and frequency drift determined, each slave clock may be adjusted to match the wall time of the master clock by adding or subtracting the offset to or from the local wall time and adjusting the slave clock's frequency.

As will be noted, IEEE 802.11, "IEEE Standard for Information Technology—Telecommunications and Information Exchange Between Systems Local and Metropolitan Area Networks" provides media access control (MAC) and physical layer (PHY) specifications for implementing wireless local area networks (WLAN) referred to basic service sets (BSS). The devices which are parts of a BSS are identified by a service set identification (SSID) which may be assigned or established by the device which starts the network. In some embodiments, each network device or station includes a local timing synchronization function (TSF) timer. In some embodiments, the device's wall clock may be based on a 1 mega-Hertz (MHz) clock which ticks in microseconds. In some embodiments, during a beacon period, all stations in an independent basic service set (IBSS) may compete to transmit a beacon. In some embodiments, each station may calculate a random delay interval and may set a delay timer scheduling transmission of a beacon when the timer expires. In some embodiments, if a beacon arrives before the delay timer expires, the receiving station may cancel its pending beacon transmission. In some embodiments, the beacon may comprise a beacon frame including a timestamp indicating the TSF timer value (e.g., the wall time) of the station that transmitted the beacon. In some embodiments, upon receiving a beacon, if the timestamp is later than the receiving station's TSF timer, the receiving station may set its TSF timer (e.g., the wall clock), to the value of the timestamp thus synchronizing the TSF timers (e.g., the wall clocks) of the transmitting station and the receiving station.

In some embodiments, PTP and TSF are responsible for synchronizing the wall clocks of all nodes in the respective network to the same wall time but not for synchronizing the sample clocks controlling the processing of the various media transported by the network. In some embodiments, the sample clocks may be recovered from the data stream at each of the network's listeners (e.g., endpoints receiving the data stream) enabling different sample clocks for different media to be transported on the same network.

Figure 4:
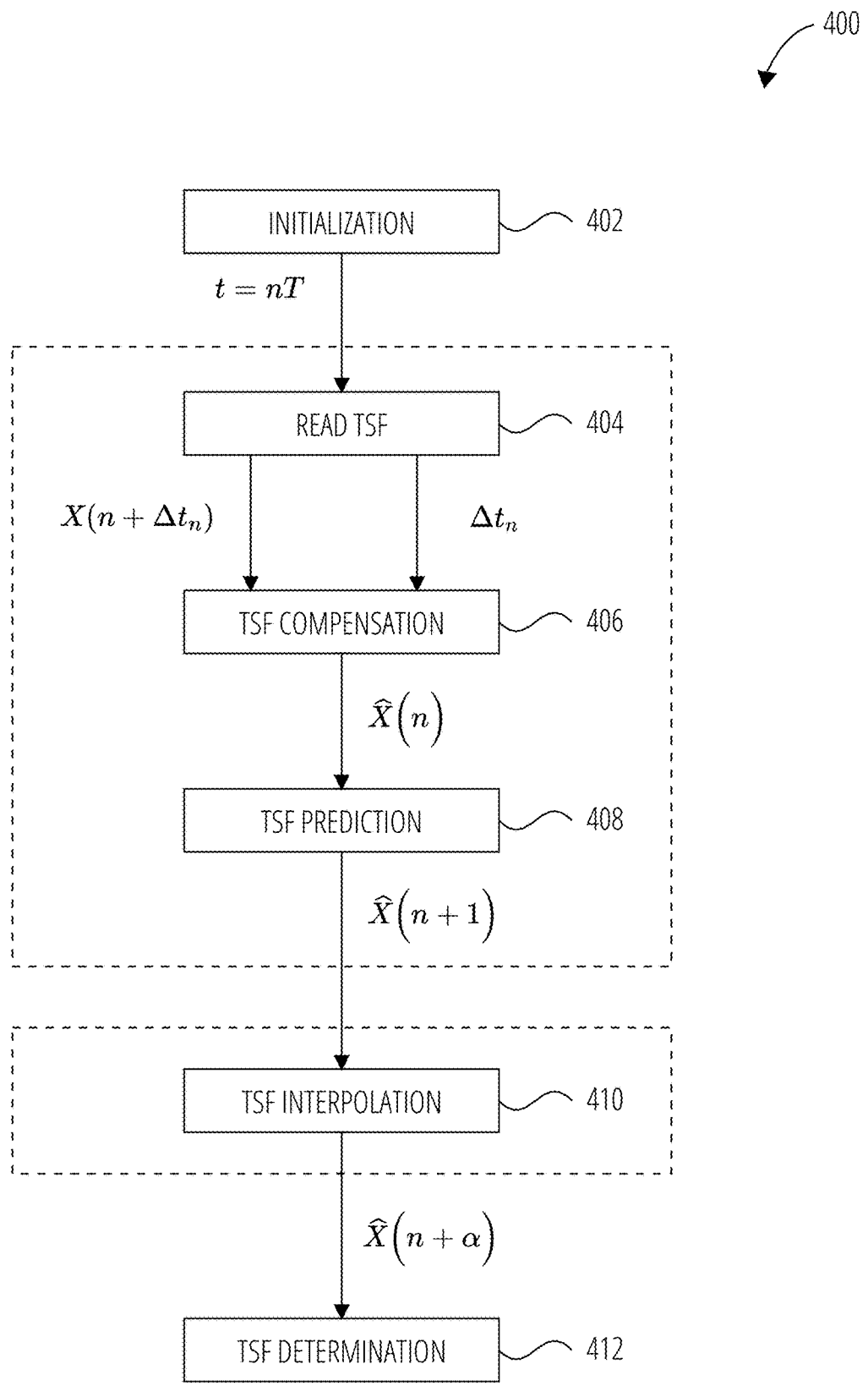
FIG. 4 illustrates a process for determining a TSF value according to some embodiments of the present disclosure.

Turning now to FIG. 4, FIG. 4 illustrates a Process 400 for determining a TSF value according to some embodiments of the present disclosure. Process 400 begins at Step 402 where a device (e.g., device 600 discussed with respect to FIG. 6, or TxSpeaker 206 and RxSpeakers 208 and 210 discussed with respect to FIG. 2) may initiate a TSF read operation. In some embodiments, a TSF read request may occur at t=nT, where T denotes a read interval time. In some embodiments, T=48 ms. In some embodiments, T=24 ms. In some embodiments, $0 \leq T \leq 1$ s.

In Step 404, at $t=nT+\Delta t_n$, the device may obtain a TSF value resulting from the TSF read operation from initiated in Step 402. In Steps 406, at $t=(n+1)T$, the device compensates for the response delay.

In some embodiments, in Step 408, the device may model a TSF function or predict a TSF value for a given n using linear regression. In those embodiments, the model parameters may be updated with each read and time delay. In some embodiments, a TSF value may be predicted using interpolation to transform non-uniform points to uniform. In some embodiments, the device may compensate the delayed TSF read with adaptive filtering using the TSF second difference to update the filter coefficients. In some embodiments, an error from the TSF reads may be modeled as nonlinear. In those embodiments, the device may compensate by using a nonlinear Volterra filter.

In some embodiments, in Step 406, the device may predict a TSF value using an adaptive filter modeled as a linear predictor. In those embodiments, the filter coefficients may be updated each time step by using the error from the predicted value from a previous iteration to the received value the current iteration. In some embodiments, when using an adaptive filter, an autoregressive model may be used to model the next TSF time:

$$\hat{X}(n+1) = \sum_{i=0}^{N-1} a_i X(n-i)$$

$$\hat{X}(n+1) = a^T X$$

Where X(n) is the TSF value at time instance n, $\hat{X}(n)$ is the estimate TSF value at time instance n, $a_i$ is the ith coefficient for delayed TSF value at index i, $a^T$ is a vector holding all coefficients, with length N, and X is a vector holding the previous N read values.

In some embodiments, $a_i$ coefficients, may be computed in a plurality of ways and may rely on knowing statistical properties of the stochastic process, X(n), it is trying to model.

In some embodiments, the coefficients may be computed, and updated, using an adaptive filter, denoted by the following equation:

$$a(n+1)=a(n)-2\ \mu X(n)e(n)$$

Where μ is the step size, e(n) is the error signal: $e(n)=X(n)-\hat{X}(n)$

Still referring to Step 406, in some embodiments, the device may predict a TSF value using a Kalman filter. In those embodiments, the system and/or function may be modeled with a state-transition model and observation model, which may be time-variant. In some embodiments, if a linear regression model is used in Step 404 (e.g., during TSF compensation), the device can use the coefficients from the linear regression model to predict the next TSF value.

In Step 410, at t=(n+α)T, the device may determine or estimate any TSF value between interpolate n and n+1 through interpolation. In some embodiments, the device may estimate a TSF value at a time instance n+a using the following equation:

$$\hat{X}(n+\alpha)=\text{INTP}(\alpha, a^T, X)$$

where INTP(α, $a^T$, X) represents an interpolation operation. As will be noted, the device may use a plurality of interpolation methods (e.g., polynomial (linear, quadratic), cubic spline, etc.)

In some embodiments, Steps 404-408 may be performed every T. In some embodiments, Steps 404-408 may be performed every T=48 ms. In some embodiments, Step 410 may be performed on demand, whenever a TSF (e.g., an estimated TSF) is needed; e.g., t=(n+α)T, 0<α<1.

Figure 5:
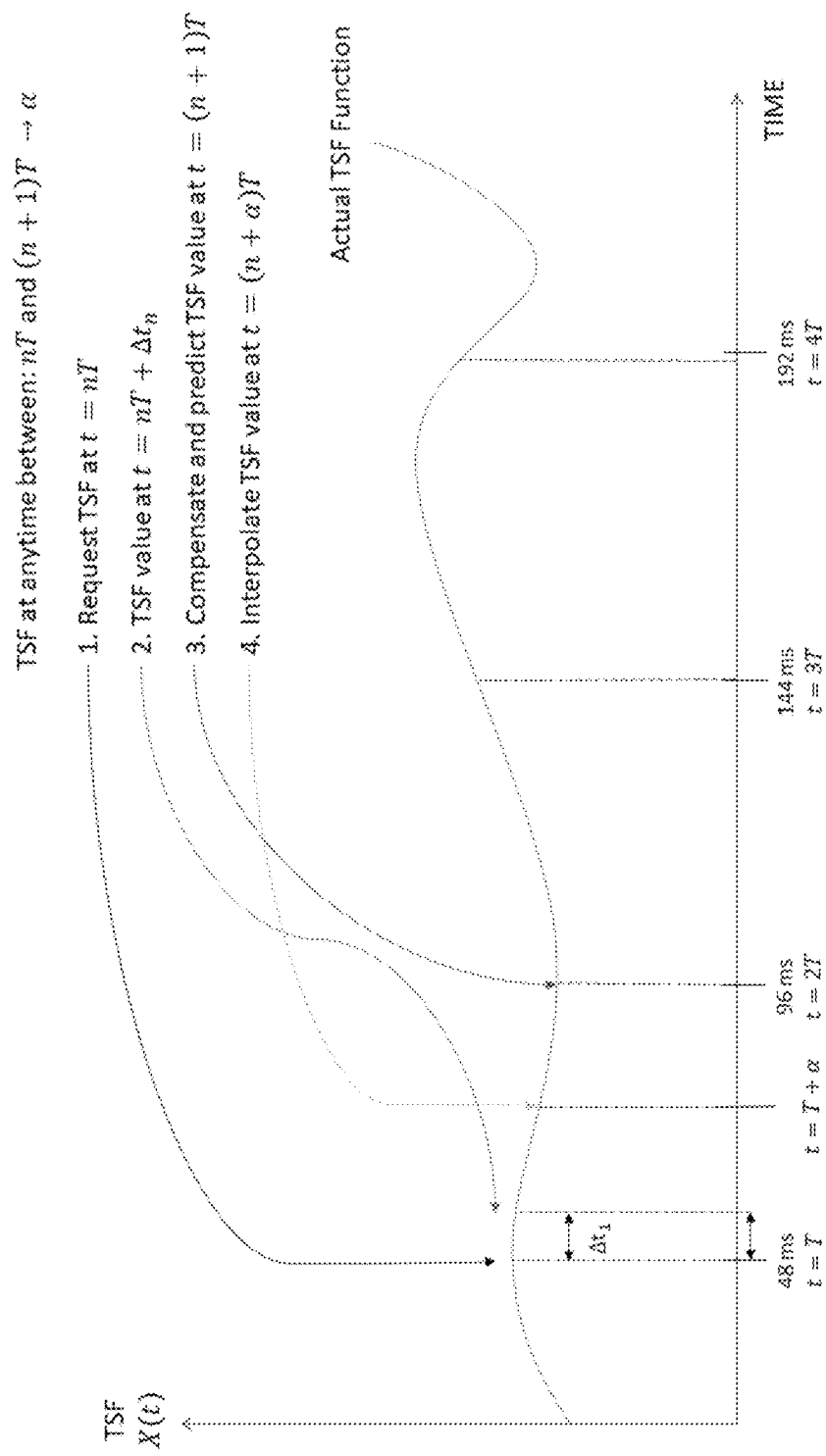
FIG. 5 is a graph illustrating a non-limiting example embodiment of the operations described with respect to FIG. 4 according to some embodiments of the present disclosure.

Turning now to FIG. 5, FIG. 5 is a graph illustrating a non-limiting example embodiment of the operations described with respect to FIG. 4.

Figure 6:
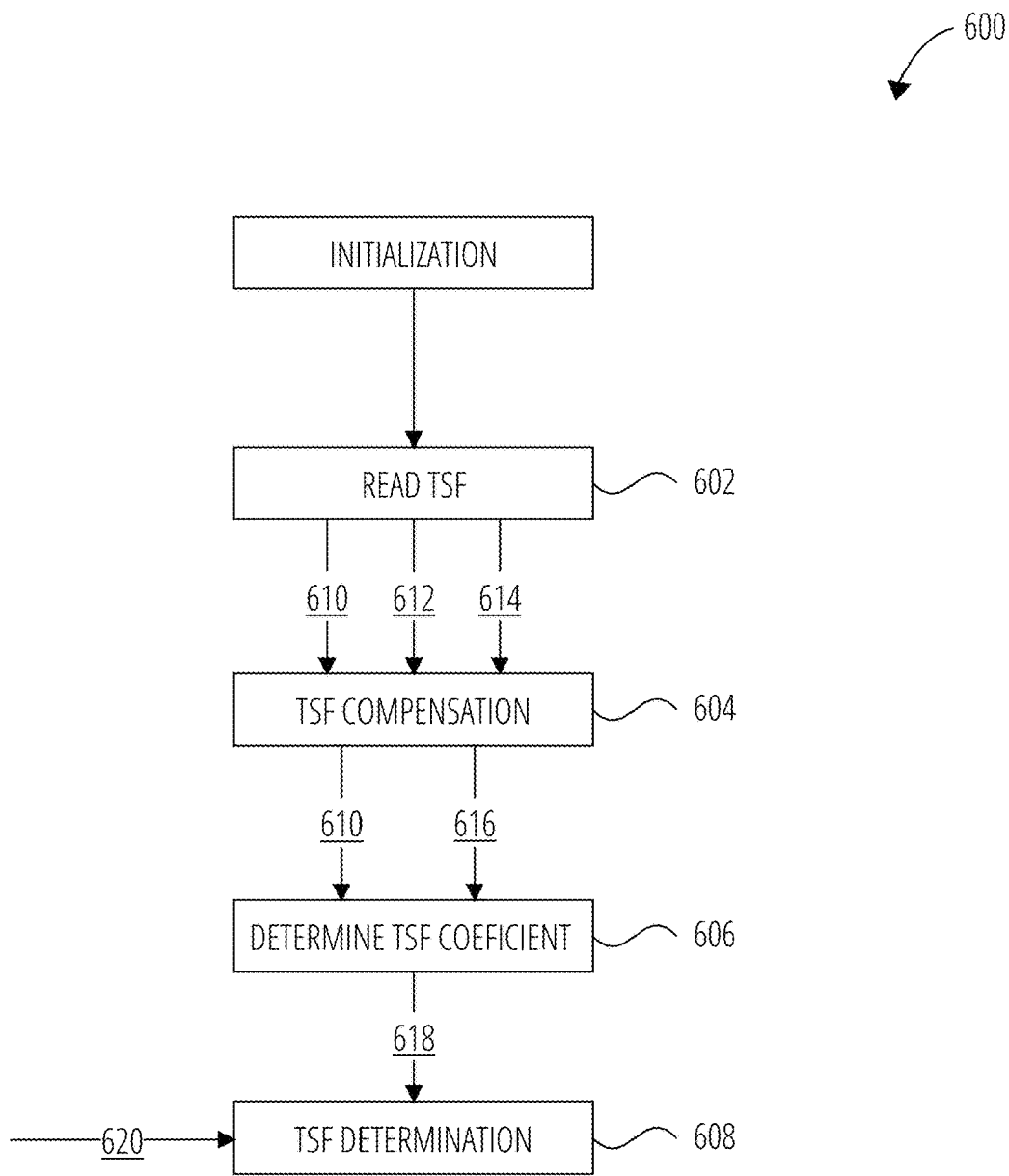
FIG. 6 illustrates a process for determining a TSF value according to some embodiments of the present disclosure.

FIG. 6 illustrates a Process 600 for determining a TSF value according to some embodiments of the present disclosure. In some embodiments, Process 600 results in a predicted or estimated TSF value using gradient descent. In those embodiments, instead of working in the "sample domain," the system time can be mapped directly to the TSF value. In some embodiments, mapping the system time to the TSF value can be computed using gradient descent to fit a linear model between system time and TSF. That is, in some embodiments, to estimate the TSF value at any time, we can use the current system time and a linear model to get the estimated TSF value.

In Step 602, Process 600 can include reading, by a device (e.g., device 700 discussed with respect to FIG. 7, or TxSpeaker 206 and RxSpeakers 208 and 210 discussed with respect to FIG. 2) a TSF value through a TSF read operation. In some embodiments, in Step 602, Process 600 can include determining a first timer value (e.g., Timer 1) 610 and a second timer value (e.g., Timer 2) 612. In some embodiments, the first timer value 610 and the second timer value 612 can be determined from one or more internal clocks of the device.

In Step 604, Process 600 can include compensating the TSF value 614 based on the first timer value 610 and second timer value 612 to remove noise correlated to the first timer value 610 and the second timer value 612.

In Step 606, Process 600 can include determining a TSF coefficient by mapping the system time to the compensated time using the first timer value 610 and the compensated TSF value 616. In some embodiments, mapping in Step 606 is accomplished using a linear model (e.g., slope and offset). In some embodiments, linear model can intake the compensated TSF value 616 and the system time (e.g., first timer value 610). In some embodiments, the linear model can also intake a step size and a momentum parameter. In some embodiments, the linear model can output an error, a slope, and an offset (e.g., TSF coefficients 618).

In Step 608, Process 600 can include determining a third timer value 620 (e.g., a current system time) and determining an estimated TSF value based on the third timer value 620 and the TSF coefficients 618. in some embodiments, the estimated TSF value is determined by combining the third timer value with the TSF coefficients 618.

Figure 7:
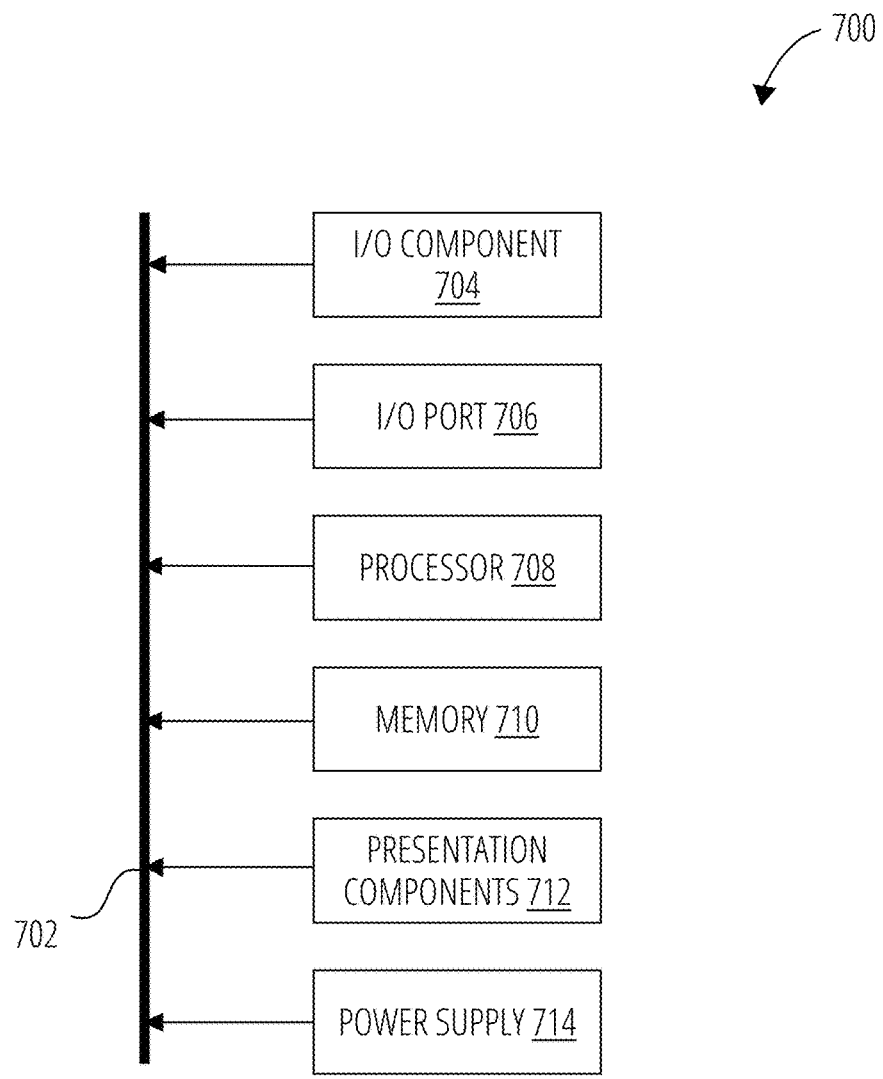
FIG. 7 is a schematic diagram illustrating an example embodiment of a device according to some embodiments of the present disclosure.

Turning now to FIG. 7, FIG. 7 is a schematic diagram illustrating an example embodiment of a device 700 (e.g., a client device, a computing device) that may be used within the present disclosure. In some embodiments, device 700 may be a source 202, a display 204, a TxSpeaker 206, a RxSpeaker 208, a RxSpeaker 210, or a combination thereof as described with respect to FIG. 2. The device 700 is merely an illustrative example of a suitable computing environment and in no way limits the scope of the present disclosure. As used herein, a "device" or "computing device" can include a "workstation," a "server," a "laptop," a "desktop," a "hand-held device," a "mobile device," a "tablet computer," or other computing devices, as would be understood by those of skill in the art. Embodiments of the present disclosure may utilize any number of devices 700 in any number of different ways to implement a single embodiment of the present disclosure. Accordingly, embodiments of the present disclosure are not limited to a single device 700, as would be appreciated by one with skill in the art, nor are they limited to a single type of implementation or configuration of the example device 700.

In some embodiments, device 700 may include a bus 702 that can be coupled to one or more of the following illustrative components, directly or indirectly: input/output (I/O) component 704, I/O port 706, one or more processors 708, one or more memories 710, one or more presentation components 712, and power supply 714. One of skill in the art will appreciate that the bus 702 can include one or more busses, such as an address bus, a data bus, or any combination thereof. One of skill in the art additionally will appreciate that, depending on the intended applications and uses of a particular embodiment, multiple of these components can be implemented by a single device. Similarly, in some instances, a single component can be implemented by multiple devices.

In some embodiments, device 700 can include or interact with a variety of computer-readable media. For example, computer-readable media can include Random Access Memory (RAM), Read Only Memory (ROM), Electronically Erasable Programmable Read Only Memory (EEPROM), flash memory or other memory technologies, CD-ROM, digital versatile disks (DVD) or other optical or holographic media, and magnetic storage devices that can be used to encode information and can be accessed by the devices 700.

In some embodiments, memory 710 can include computer-storage media in the form of volatile and/or nonvolatile memory. In some embodiments, memory 710 may be removable, non-removable, or any combination thereof. For example, in some embodiments, memory 710 may be a hardware device such as hard drives, solid-state memory, optical-disc drives, and the like.

In some embodiments, device 700 can include one or more processors that read data from components such as the memory 710, the various I/O components 704, etc. In some embodiments, presentation components 712 present data indications to a user or other device. For example, in some embodiments, presentation components 712 may include a display device, speaker, a printing component, a haptic component, etc.

In some embodiments, the I/O ports 706 can enable the device 700 to be logically coupled to other devices, such as I/O components 704. In some embodiments, some of the I/O components 704 can be built into the device 700. In some embodiments, I/O component 704 may be a microphone, joystick, recording device, game pad, satellite dish, scanner, printer, wireless device, networking device, and the like. In some embodiments, I/O port 706 may utilize one or more communication technologies, such as USB, infrared, Bluetooth™, or the like.

As utilized herein, the terms "comprises" and "comprising" are intended to be construed as being inclusive, not exclusive. As utilized herein, the terms "exemplary", "example", and "illustrative", are intended to mean "serving as an example, instance, or illustration" and should not be construed as indicating, or not indicating, a preferred or advantageous configuration relative to other configurations. As utilized herein, the terms "about", "generally", and "approximately" are intended to cover variations that may existing in the upper and lower limits of the ranges of subjective or objective values, such as variations in properties, parameters, sizes, and dimensions. In one non-limiting example, the terms "about", "generally", and "approximately" mean at, or plus 10 percent or less, or minus 10 percent or less. In one non-limiting example, the terms "about", "generally", and "approximately" mean sufficiently close to be deemed by one of skill in the art in the relevant field to be included. As utilized herein, the term "substantially" refers to the complete or nearly complete extend or degree of an action, characteristic, property, state, structure, item, or result, as would be appreciated by one of skill in the art. For example, an object that is "substantially" circular would mean that the object is either completely a circle to mathematically determinable limits, or nearly a circle as would be recognized or understood by one of skill in the art. The exact allowable degree of deviation from absolute completeness may in some instances depend on the specific context. However, in general, the nearness of completion will be so as to have the same overall result as if absolute and total completion were achieved or obtained. The use of "substantially" is equally applicable when utilized in a negative connotation to refer to the complete or near complete lack of an action, characteristic, property, state, structure, item, or result, as would be appreciated by one of skill in the art.

Numerous modifications and alternative embodiments of the present invention will be apparent to those skilled in the art in view of the foregoing description. Accordingly, this description is to be construed as illustrative only and is for the purpose of teaching those skilled in the art the best mode for carrying out the present invention. Details of the structure may vary substantially without departing from the spirit of the present invention, and exclusive use of all modifications that come within the scope of the appended claims is reserved. Within this specification embodiments have been described in a way which enables a clear and concise specification to be written, but it is intended and will be appreciated that embodiments may be variously combined or separated without parting from the invention. It is intended that the present invention be limited only to the extent required by the appended claims and the applicable rules of law.

It is also to be understood that the following claims are to cover all generic and specific features of the invention described herein, and all statements of the scope of the invention which, as a matter of language, might be said to fall therebetween.

What is claimed is:

1. A method comprising:
 requesting a timing synchronization function (TSF) value;
 receiving a first TSF value after a TSF read delay; and
 predicting a second TSF value using a prediction model based on a compensated first TSF value, compensated using the TSF read delay;
 wherein the compensation is achieved using adaptive filtering.

2. The method of claim 1, further comprising:
 estimating a third TSF value between the first TSF value and the second TSF value by interpolating the first TSF value and the second TSF value.

3. A method comprising:
 requesting a timing synchronization function (TSF) value;
 receiving a first TSF value after a TSF read delay;
 predicting a second TSF value using a prediction model based on a compensated first TSF value, compensated using the TSF read delay; and
 estimating a third TSF value between the first TSF value and the second TSF value by interpolating the first TSF value and the second TSF value;
 wherein the interpolation uses an interpolation method selected from the group comprising: polynomial and cubic spline.

4. The method of claim 1, wherein prediction model is a linear regression model.

5. A wireless audio device configured to perform the method of claim 1.

6. A method comprising:
    requesting a timing synchronization function (TSF) value;
    receiving a first TSF value after a TSF read delay; and
    predicting a second TSF value using a prediction model based on a compensated first TSF value, compensated using the TSF read delay;
    wherein the compensation is achieved using a Volterra filter.

7. The method of claim 1, wherein the prediction model is a gradient descent model.

8. A non-transitory computer-readable storage medium, the computer-readable storage medium including instructions that when executed by a device, cause the device to:
    request a timing synchronization function (TSF) value;
    receive a first TSF value after a TSF read delay; and
    predict a second TSF value using a prediction model based on a compensated first TSF value, compensated using the TSF read delay;
    wherein the compensation is achieved using adaptive filtering.

9. The computer-readable storage medium of claim 8, wherein the instructions further configure the device to:
    estimate a third TSF value between the first TSF value and the second TSF value by interpolating the first TSF value and the second TSF value.

10. A non-transitory computer-readable storage medium, the computer-readable storage medium including instructions that when executed by a device, cause the device to:
    request a timing synchronization function (TSF) value;
    receive a first TSF value after a TSF read delay; and
    predict a second TSF value using a prediction model based on a compensated first TSF value, compensated using the TSF read delay;
    estimate a third TSF value between the first TSF value and the second TSF value by interpolating the first TSF value and the second TSF value;
    wherein the interpolation uses an interpolation method selected from the group comprising: polynomial and cubic spline.

11. The computer-readable storage medium of claim 8, wherein prediction model is a linear regression model.

12. A wireless audio device comprising the computer-readable storage medium of claim 8.

13. A non-transitory computer-readable storage medium, the computer-readable storage medium including instructions that when executed by a device, cause the device to:
    request a timing synchronization function (TSF) value;
    receive a first TSF value after a TSF read delay; and
    predict a second TSF value using a prediction model based on a compensated first TSF value, compensated using the TSF read delay;
    wherein the compensation is achieved using a Volterra filter.

14. The computer-readable storage medium of claim 8, wherein the prediction model is a gradient descent model.

15. A device comprising:
    a processor; and
    a memory storing instructions that, when executed by the processor, configure the device to:
    request a timing synchronization function (TSF) value;
    receive a first TSF value after a TSF read delay; and
    predict a second TSF value using a prediction model based on a compensated first TSF value, compensated using the TSF read delay;
    wherein the compensation is achieved using adaptive filtering.

16. The device of claim 15, wherein the instructions further configure the device to:
    estimate a third TSF value between the first TSF value and the second TSF value by interpolating the first TSF value and the second TSF value.

17. The device of claim 15, wherein prediction model is a linear regression model.

18. The device of claim 15, wherein the device is a wireless audio device comprising at least one of a wireless audio transmitter and a wireless audio receiver.

19. A device comprising:
    a processor; and
    a memory storing instructions that, when executed by the processor, configure the device to:
    request a timing synchronization function (TSF) value;
    receive a first TSF value after a TSF read delay; and
    predict a second TSF value using a prediction model based on a compensated first TSF value, compensated using the TSF read delay;
    wherein the compensation is achieved using adaptive filtering;
    wherein the compensation is achieved using a Volterra filter.

20. The device of claim 15, wherein the prediction model is a gradient descent model.

* * * * *